Dec. 6, 1927. 1,651,587
O. DEHNE
COMBINED HANDLE BAR AND ACTUATING DEVICE FOR THE
CHANGE SPEED GEARS OF MOTOR CYCLES
Original Filed Oct. 21, 1924
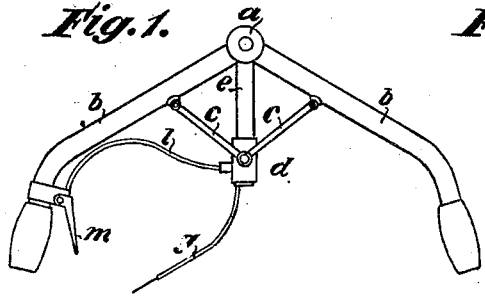
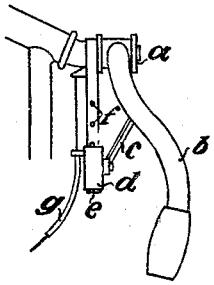
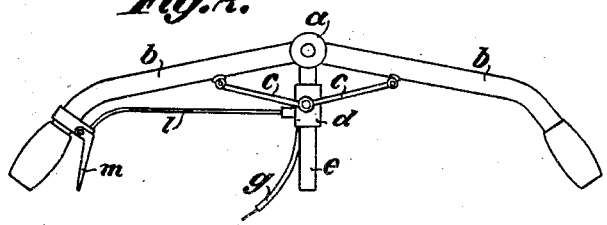
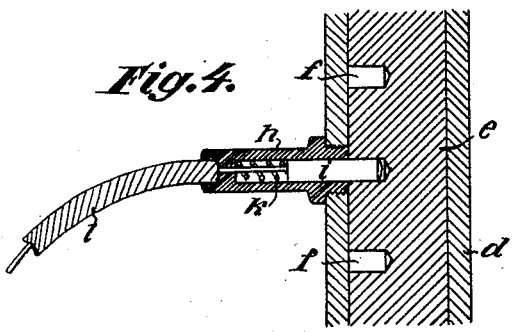
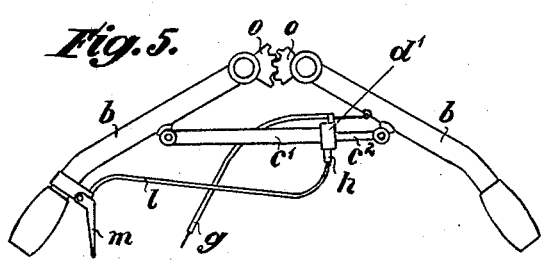
INVENTOR
Otto Dehne
BY: Francis E. Boyce
ATTORNEY Patented Dec. 6, 1927.

1,651,587

UNITED STATES PATENT OFFICE.

OTTO DEHNE, OF SUHL, GERMANY.

COMBINED HANDLE BAR AND ACTUATING DEVICE FOR THE CHANGE-SPEED GEARS OF MOTOR CYCLES.

Application filed October 21, 1924, Serial No. 744,880, and in Germany October 23, 1923. Renewed February 18, 1927.

This invention relates to the changing-over of the several speed-steps of the change-speed gear of a motorcycle; the object of the invention is to facilitate that changing-over by an arrangement and combination of parts comprising a bipartite handle-bar, the lefthand and the righthand half of which can be turned relatively to one another, and means transmitting the movement of the handle-bar halves to the change-speed gear a separate control-bar being now dispensed with so that both hands can remain constantly at the handle-rod.

I am aware of the existance of rotary handle-bar grips which are connected with the change-speed gearing and by the turning of which this gearing is controlled, but their turning-angle is too small for the proper actuation of a normal change-speed gear. I am also aware of the existence of bipartite handle-bars, the halves or arms of which can be turned horizontally, but these halves or arms are not connected with the change-speed gearing. In contradistinction to these known arrangements and combinations of parts there are, in my new one, the handle-bar arms connected with the change-speed gearing by a transmission member or members which may be rigid or flexible, that is to say, the motion of said arms may be transmitted to said gearing by a rod or rods or by a rope or ropes or an equivalent member or members. Owing to the present improved arrangement the bearing or carriage of the body of the cyclist will be different at different speeds of the cycle, and the arrangement may be such that the body of the cyclist is bent forward more at the higher speeds and less at the lower ones.

In order to cause the handle-bar arms to cover equal angles when being turned independently of the front-wheel forkshaft they are connected with each other either by rods and a sliding sleeve, or by cogged sectors, or by equivalent means, and they may be secured in their relative position, whichever it may be, by a pawl-device adapted to be operated by hand or by foot, or being connected with the coupling lever or the compression-reducing lever, as best suited for the respective type of motor-cycle or as desired or preferred.

My invention is illustrated by way of example in the accompanying drawing, in which Figure 1 is a plan of a handle-bar and of certain parts connected therewith; Figure 2 is a similar view showing the same parts in another position; Figure 3 is a side-view of the parts shown in Fig. 2; Figure 4 is a section through a pawl-device intended for use in connection with an arrangement of the kind shown in Figs. 1–3 and being drawn to an enlarged scale; and Figure 5 is a view also similar to Fig. 1, but showing a modification.

Referring to Figs. 1–3 $a$ denotes the top of the steering fork shaft, $b$ $b$ the two handle-bar arms, and $e$ $e$ two rods hinged to the arms $b$ $b$ and connected movably with an arm $c$ affixed firmly to the steering-fork shaft $a$ and extending horizontally in the direction to the cyclist's seat (not shown). The arm $c$ is provided on one side (the left, in the example shown) with several bores $f$ (Figs. 3 and 4). The sleeve $d$ can be shoved along on the arm $c$ by the intermediary of the rods $e$ $e$ when the handle-bar arms are turned towards one another or away from one another but the sleeve $d$ can be moved along on the arm $c$ only after having been uncoupled from it. The coupling member consists of a bolt $i$ that can enter into any of the bores $f$ of the arm $c$, and can be withdrawn from that bore in which it is located at the time being by means of a handle-lever $m$ (Figs. 1 and 2) attached to one of the handle-bar arms $b$ $b$ (the left in the example shown) near the grip thereof. The lever $m$ and the bolt $i$ are connected with one another by a flexible member $l$. The bolt is guided in a small casing $h$ (Fig. 4) screwed into the sleeve $d$ and enclosing a helical spring $k$ which is compressed when the bolt is withdrawn from the respective bore, whereby the sleeve is uncoupled from the arm $e$ and the handle-bar arms are free to be turned on the shaft $a$. The sleeve is also connected with a wire-rope $g$ by means of which the motion and the power are transmitted to the change-speed gearing (not shown) which then is actuated in correspondence with the extent of motion of the handle-bars $b$ $b$.

In the modified form illustrated in Fig. 5 each handle-bar arm is located on a pivot of its own and provided with a cogged sector $o$, the two sectors meshing with one another, as shown, and instead of the two rods $e$ $e$ (Figs. 1–3) a tube $c'$ is hinged to one of the handle-bar arms and a rod $c^2$ to the other thereof, the rod sliding in this tube. Instead of the separate sleeve $d$ (Figs. 1–3) a collar-like sleeve $d'$ is secured to the free end of the tube $c'$. Concerning the small casing $h$, the bolt $i$ therein and the bores $f$ in the rod $c^2$, this is essentially just so as in the first form described and will be clear without further details.

What I claim, is:—

In a motor-cycle, in combination: a bipartite handle-bar comprising two arms adapted to be moved conjointly in a horizontal or nearly horizontal plane; grips affixed rigidly to said arms; and means for transmitting the movements of the said handle-bar arms to the change-speed gearing of the motor-cycle.

In testimony whereof I have signed my name to this specification.

OTTO DEHNE.